US011465100B2

(12) United States Patent
Wan et al.

(10) Patent No.: US 11,465,100 B2
(45) Date of Patent: Oct. 11, 2022

(54) THIN FILM COMPOSITE HOLLOW FIBRE MEMBRANE

(71) Applicant: NATIONAL UNIVERSITY OF SINGAPORE, Singapore (SG)

(72) Inventors: Chunfeng Wan, Singapore (SG); Tianshi Yang, Singapore (SG); Wenxiao Gai, Singapore (SG); Tai-Shung Neal Chung, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 43 days.

(21) Appl. No.: 16/766,024

(22) PCT Filed: Nov. 30, 2018

(86) PCT No.: PCT/SG2018/050586
§ 371 (c)(1),
(2) Date: May 21, 2020

(87) PCT Pub. No.: WO2019/108136
PCT Pub. Date: Jun. 6, 2019

(65) Prior Publication Data
US 2020/0298185 A1    Sep. 24, 2020

(30) Foreign Application Priority Data
Nov. 30, 2017 (SG) .............. 10201709922X

(51) Int. Cl.
*B01D 69/08* (2006.01)
*B01D 69/12* (2006.01)
(Continued)

(52) U.S. Cl.
CPC ......... *B01D 69/085* (2013.01); *B01D 61/002* (2013.01); *B01D 69/10* (2013.01);
(Continued)

(58) Field of Classification Search
CPC ............ B01D 2323/40; B01D 2325/04; B01D 2325/20; B01D 2325/24; B01D 61/002;
(Continued)

(56) References Cited

U.S. PATENT DOCUMENTS 8,920,654 B2 * 12/2014 Revanur ............... B01D 71/44
210/644
10,987,846 B2 * 4/2021 Zhang .................. B01D 69/10
(Continued)

FOREIGN PATENT DOCUMENTS

CN   105797601    7/2016
KR   10-1729183   5/2017

OTHER PUBLICATIONS

Chun Feng Wan, et al., "Thin-film composite hollow fiber membrane with inorganic salt additives for high mechanical strength and high power density for pressure-retarded osmosis", Journal of Membrane Science, vol. 555, Mar. 26, 2018, pp. 388-397.
(Continued)

*Primary Examiner* — Dirk R Bass
(74) *Attorney, Agent, or Firm* — Nixon & Vanderhye, P.C.

(57) ABSTRACT

There is provided a thin film composite (TFC) hollow fibre membrane comprising a porous hollow fibre support layer formed of a polymer and a selective layer, formed of a cross-linked polyamide, on an inner circumferential surface of the hollow fibre support layer, wherein the TFC hollow fibre membrane has a power density of 25-50 W/m² at a pressure of 30 bar. There is also provided a method of forming the TFC hollow fibre membrane.

17 Claims, 9 Drawing Sheets

(51) Int. Cl.
  *B01D 69/10* (2006.01)
  *B01D 71/56* (2006.01)
  *B01D 61/00* (2006.01)
  *B01D 71/68* (2006.01)
(52) U.S. Cl.
  CPC ........... *B01D 69/125* (2013.01); *B01D 71/56* (2013.01); *B01D 71/68* (2013.01); *B01D 2323/42* (2013.01); *B01D 2325/02* (2013.01); *B01D 2325/04* (2013.01); *B01D 2325/20* (2013.01)
(58) Field of Classification Search
  CPC ........ B01D 69/02; B01D 69/08; B01D 69/10; B01D 69/125; B01D 71/56; B01D 71/68; B01D 2323/42; B01D 2325/02; B01D 67/0006; B01D 69/085
  See application file for complete search history.

(56) References Cited

U.S. PATENT DOCUMENTS

| 2012/0080378 | A1* | 4/2012 | Revanur | B01D 69/148 |
| | | | | 210/644 |
| 2014/0008291 | A1* | 1/2014 | Tang | B01D 61/002 |
| | | | | 210/499 |
| 2016/0121533 | A1* | 5/2016 | Zhang | B01D 69/08 |
| | | | | 210/500.23 |
| 2017/0266625 | A1* | 9/2017 | Kiguchi | C02F 1/445 |
| 2021/0178338 | A1* | 6/2021 | Lee | B01D 71/56 |

OTHER PUBLICATIONS

International Search Report for PCT/SG2018/050586 dated Feb. 18, 2019, 4 pages.
Written Opinion of the ISA for PCT/SG2018/050586 dated Feb. 18, 2019, 7 pages.

* cited by examiner

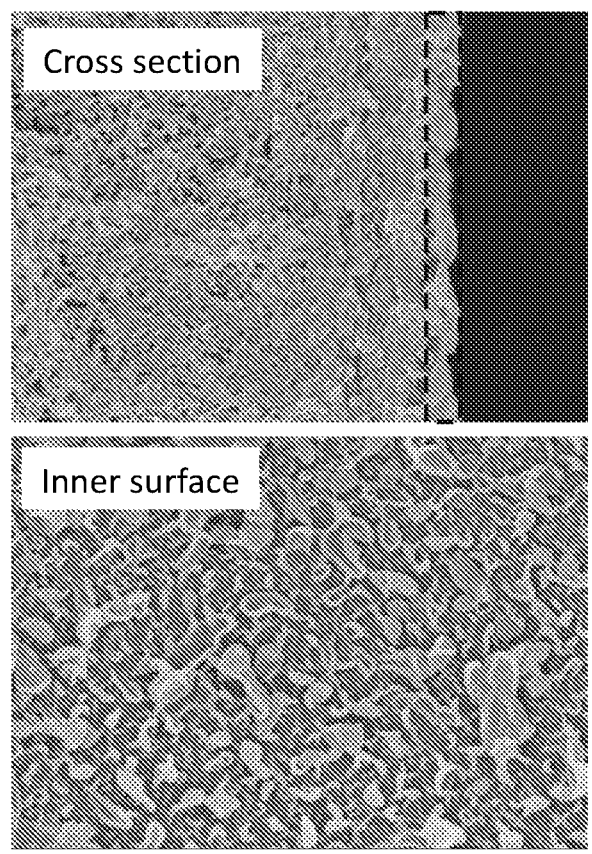
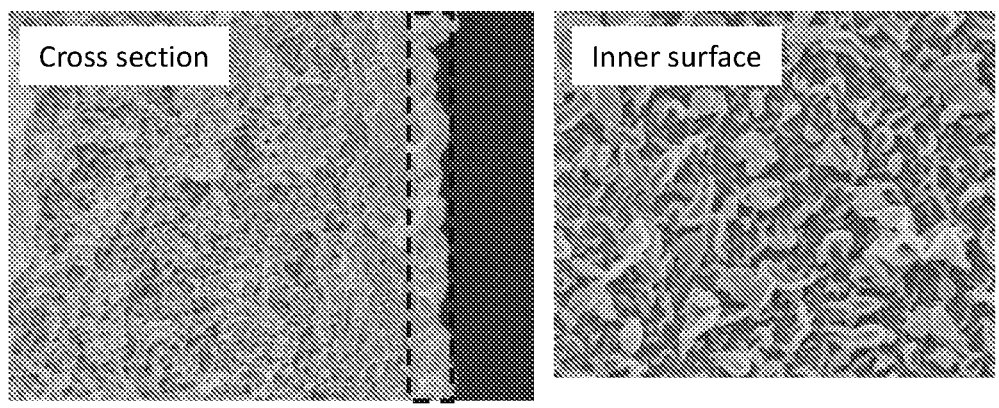

THIN FILM COMPOSITE HOLLOW FIBRE MEMBRANE

This application is the U.S. national phase of International Application No. PCT/SG2018/050586 filed Nov. 30, 2018 which designated the U.S. and claims priority to SG Patent Application No. 10201709922X filed Nov. 30, 2017, the entire contents of each of which are hereby incorporated by reference.

TECHNICAL FIELD

The present invention relates to a thin film composite hollow fibre membrane and a method of forming the same.

BACKGROUND

Escalating population growth and industrialization based on fossil fuels have resulted in extra-high $CO_2$ emission and global warming, leading to active explorations of renewable and clean energies. Osmotic energy is a promising candidate. Several technologies have been developed to harvest the osmotic energy, including pressure retarded osmosis (PRO), reverse electro-dialysis (RED), capacitive mixing and hydrogel swelling. PRO is the most widely investigated technology due to its greater efficiency and higher power density. PRO exploits the free osmotic energy released when water from a low-salinity feed solution spontaneously flows through a semi-permeable membrane and mixes with a pressurized higher salinity draw solution. Osmotic energy is converted to useful works when the pressurized draw solution with an increased flowrate is discharged through an energy recovery device or a hydro-turbine.

The most widely studied application of PRO is to harvest the osmotic energy where rivers meet the oceans. However, this produces a low extractable energy and an even thinner net energy output due to the low salinity gradient and high energy consumptions for the extensive pre-treatments of the feed pair. Draw solutions with a higher salinity are therefore favoured to generate a higher energy output. The worldwide seawater desalination capacity has reached 86.8 million $m^3$/day. This produces a huge amount of waste concentrated brine, which can be an ideal source of draw solution for PRO. Utilization of concentrated seawater brine will not only increase the energy output but also relieve the energy consumption to pre-treat the draw solution.

Membrane is the core of PRO technologies. Since the theoretical highest power density occurs at approximately one-half of the osmotic pressure difference or even higher due to the effects of reverse salt flux and concentration polarizations, utilization of a highly saline draw solution requires PRO membranes which can not only withstand a higher operating pressure but also produce a higher power density under high pressure conditions. Thin film composite (TFC) membranes prepared by interfacial polymerization have shown promising results in engineering osmosis processes. TFC membranes offer the advantages of optimizing: the robustness and pore structure of the substrates; and the permeability and permselectivity of the thin polyamide selective layers separately.

The osmotic pressure of seawater is about 27 bar on average. Therefore utilisation of seawater brine in PRO necessitates the development of membranes that can sustain at least 27 bar and generate higher energy per membrane area. US 2016/0121533 discloses an inner-selective TFC hollow fibre membrane having a peak power density of about 24.0 W/$m^2$ at 20 bar. However, the membrane has a burst pressure of about 21 bar and therefore does not make it an ideal candidate for PRO applications with seawater brine as the draw solution.

There is therefore a need for an improved TFC hollow fibre membrane.

SUMMARY OF THE INVENTION

The present invention seeks to address these problems, and/or to provide an improved thin film composite (TFC) hollow fibre membrane.

In general terms, the invention relates to a TFC hollow fibre membrane which has a high operating pressure, thereby making it suitable for use in several applications, including PRO application with seawater brine as the draw solution. With a higher operating pressure, the membrane may operate at the optimal pressure and achieve the peak power density to fully harvest osmotic energy. Further, the TFC hollow fibre membrane of the present invention may also have a high power density. In this way, less membrane area may be needed to achieve the same total energy output, thereby resulting in a reduction of capital cost and membrane replacement cost. The TFC hollow fibre membrane of the present invention may be an inner-selective TFC membrane. Accordingly, the TFC hollow fibre membrane may be easier to fabricate and scale up.

According to a first aspect, the present invention provides a thin film composite (TFC) hollow fibre membrane comprising:

a porous hollow fibre support layer formed of polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof, the hollow fibre support layer having a thickness of 100-500 µm; and a selective layer on an inner circumferential surface of the hollow fibre support layer, the selective layer formed of a cross-linked polyamide and having a thickness of 100-500 nm, wherein the TFC hollow fibre membrane has a power density of 25-50 W/$m^2$ at a pressure of 30 bar.

According to a particular aspect, the hollow fibre support layer may be formed of polyethersulfone.

The TFC hollow fibre membrane may have suitable properties. For example, the TFC hollow fibre membrane may have a pure water permeability rate of 3.5-4.0 L m$^{-2}$ h$^{-1}$ bar$^{-1}$. The TFC hollow fibre membrane may have a burst pressure of at least 28-35 bar. The TFC hollow fibre membrane may have a salt rejection rate of 92-99.5%.

The TFC hollow fibre membrane may be used for any suitable applications. In particular, the TFC hollow fibre membrane may be for use in pressure retarded osmosis (PRO).

According to a second aspect, the present invention provides a method of forming the TFC hollow fibre membrane according to the first aspect, the method comprising:

preparing a module comprising at least one porous hollow fibre support layer potted in the module; and forming a selective layer on an inner circumferential surface of the hollow fibre support layer through interfacial polymerization, wherein the forming comprises contacting the surface of the porous hollow fibre support layer with a first solution comprising a polyamine, removing excess of the first solution by purging air and subsequently contacting the surface of the porous hollow fibre support layer with a second solution comprising a polyfunctional acyl halide.

According to a particular aspect, the porous hollow fibre support layer may be prepared by providing a dope solution comprising a polymer solution, a solvent/non-solvent mixture, an inorganic salt and water to an annulus of a spinneret, the polymer solution comprising: polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof;

providing a bore solution to an inner tube of the spinneret; and extruding the dope solution and bore solution through the spinneret into a coagulation bath, thereby obtaining a porous hollow fibre support layer.

The inorganic salt may be any suitable inorganic salt. According to a particular aspect, the inorganic salt may be any suitable chloride, bromide or a combination thereof. For example, the inorganic salt may be, but not limited to, LiBr, $CaCl_2$, LiCl, $MgCl_2$, or a combination thereof. In particular, the inorganic salt may be $CaCl_2$.

The first solution may comprise any suitable polyamine. For example, the polyamine may be, but not limited to, m-phenylenediamine (MPD), p-phenylenediamine, p-xylylenediamine, cyclohexanediamine, piperazine, branched or dendrimeric polyethylenimine, or a combination thereof.

According to a particular aspect, the first solution may further comprise a surfactant. The surfactant may be any suitable surfactant. For example, the surfactant may be, but not limited to, sodium dodecyl sulphate (SDS), trimethylamine (TEA), camphorsulfonic acid (CSA), or a combination thereof.

The second solution may comprise any suitable polyfunctional acyl halide. For example, the polyfunctional acyl halide may be, but not limited to, trimesoyl chloride (TMC), isophthaloyl chloride, terephthaloyl chloride, 1,3,5-cyclohexane tricarbonyl chloride, 1,2,3,4-cyclohexane tetracarbonyl chloride, or a combination thereof.

According to a particular aspect, the second solution may further comprise an organic solvent. The organic solvent may be any suitable organic solvent. For example, the organic solvent may be, but not limited to, hexane, heptane, cyclohexane, isoparaffinic hydrocarbon, or a combination thereof.

The present invention also provides a method of generating osmotic power, the method comprising performing pressure retarded osmosis (PRO) using the TFC hollow fibre membrane according to the first aspect or a TFC hollow fibre membrane formed by the method of the second aspect of the present invention.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 3A shows the process for a polymer dope comprising 0 wt % $CaCl_2$ salt, FIG. 3B shows the same process for a polymer dope comprising 1 wt % $CaCl_2$ salt, and FIG. 3C shows the same process for a polymer dope comprising 2 wt % $CaCl_2$ salt;

FIGS. 7A, 7B and 7C shows the FESEM morphologies of the TFC hollow fibre membranes formed from polymer dope comprising 0 wt %, 1 wt % and 2 wt % $CaCl_2$, respectively; FIG. 8A shows the results of power density, FIG. 8B shows the results of water flux and FIG. 8C shows the results of reverse salt flux.

DETAILED DESCRIPTION

Figure 1:
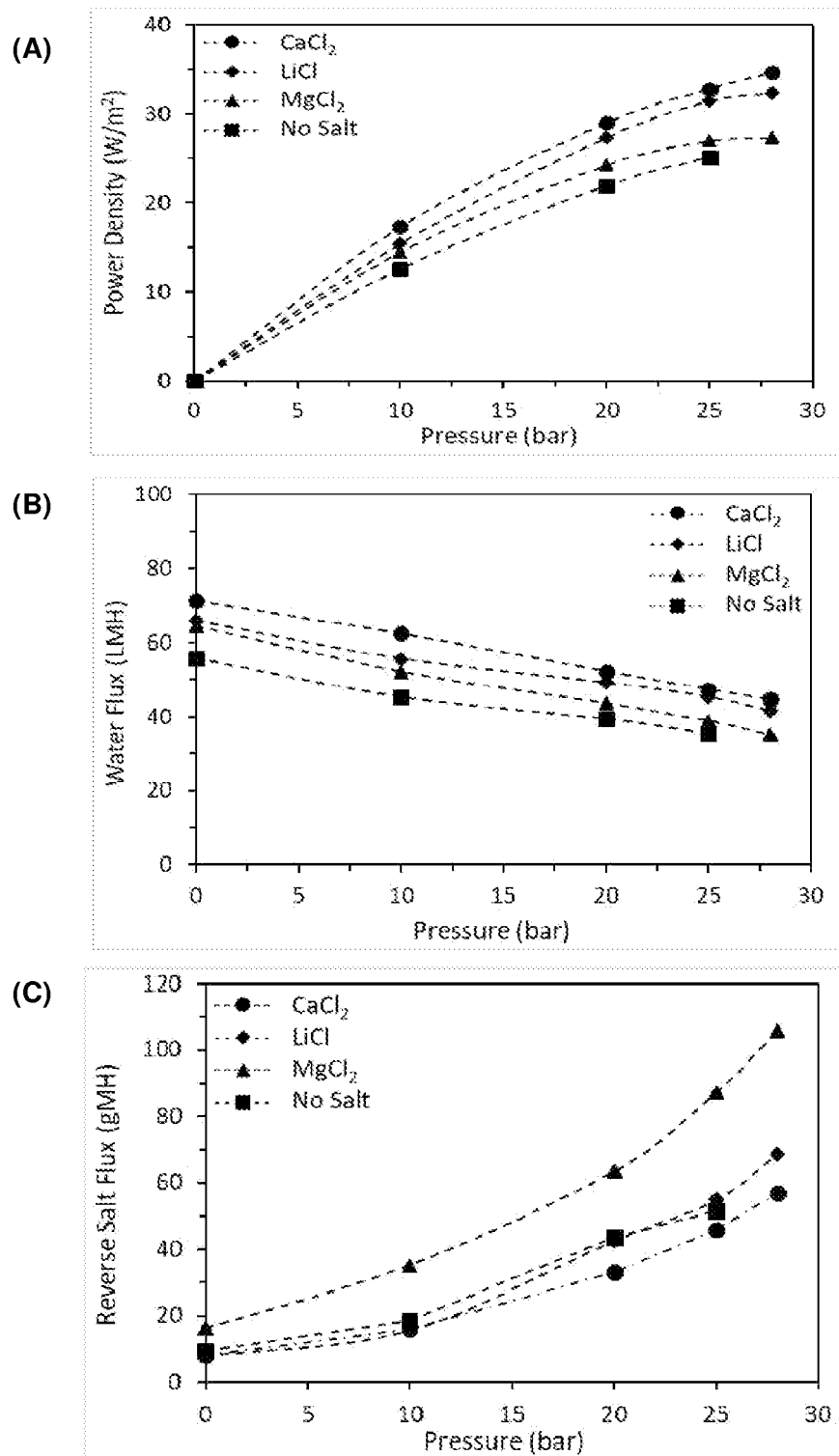
FIG. 1A shows the power density.
FIG. 1B shows the water flux and FIG. 1C shows the reverse salt flux of the TFC hollow fibre membranes according to embodiments of the present invention.

As explained above, there is a need for an improved membrane which is able to sustain high operating pressures, having superior transport properties while achieving a high power density.

In general terms, the present invention provides an inner-selective thin film composite (TFC) hollow fibre membrane which can sustain high operating pressures of above 30 bar and provide high power density, thereby making the membrane useful for osmotic power generation. The membrane of the present invention may be used in several applications including, but not limited to, pressure retarded osmosis, low pressure reverse osmosis, brackish water reverse osmosis, and nanofiltration. In particular, the osmotic energy produced as a result of using the membrane of the present invention may be comparable to other renewable energies.

The present invention also provides an improved method of forming the TFC hollow fibre membrane, which results in a TFC hollow fibre membrane having improved mechanical and transport properties so that it would produce higher osmotic energy.

According to a first aspect, the present invention provides a thin film composite (TFC) hollow fibre membrane comprising:

a porous hollow fibre support layer formed of polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof, the hollow fibre support layer having a thickness of 100-500 µm; and a selective layer on an inner circumferential surface of the hollow fibre support layer, the selective layer formed of a cross-linked polyamide and having a thickness of 100-500 nm, wherein the TFC hollow fibre membrane has a power density of 25-50 $W/m^2$ at a pressure of 30 bar.

In particular, the hollow fibre support layer may be formed of polyethersulfone (PES).

The thickness of the hollow fibre support layer may be 100-350 μm. For example, the thickness of the hollow fibre support layer may be 150-300 μm, 175-275 μm, 200-250 μm, 220-225 μm. In particular, the thickness may be 200-300 μm. Even more in particular, the thickness may be 250-300 μm.

The hollow fibre support layer may comprise at least two layers of uniform macrovoids. Accordingly, the macrovoids help to distribute the stress evenly over the cross section of the layer and also provide open channels for the trans-membrane water flux.

The thickness of the selective layer may be 100-500 nm. For example, the thickness of the selective layer may be 120-480 nm, 150-450 nm, 175-425 nm, 200-400 nm, 220-380 nm, 250-350 nm, 275-325 nm, 300-310 nm. In particular, the thickness may be about 255-330 nm.

The TFC hollow fibre membrane achieves a favourable power density, making it a candidate for use in power generation. The power density may vary depending on the pressure applied during the osmosis process. In particular, the power density of the TFC hollow fibre membrane may be 25-50 $W/m^2$. For example, the power density achieved may be 27-48 $W/m^2$, 28-45 $W/m^2$, 30-40 $W/m^2$, 32-38 $W/m^2$, 35-37 $W/m^2$. In particular, the power density achieved may be 38 $W/m^2$ at 30 bar using a 1.2 M NaCl solution and deionised (DI) water as the draw and feed solutions, respectively.

According to a particular aspect, the TFC hollow fibre membrane has a suitably high burst pressure. For the purposes of the present invention, the burst pressure may be defined as the highest pressure sustained by the membrane before structural failure. The burst pressure of the membrane of the present invention may be at least 28 bar. In particular, the burst pressure may be 28-35 bar, 29-34 bar, 30-33 bar, 31-32 bar. Even more in particular, the burst pressure may be about 33 bar. With higher burst pressures compared to other inner-selective TFC hollow fibre membranes, the membranes of the present invention may be more suitable for use in applications such as in PRO when a hypersaline draw solution, such as seawater brine, is used.

In addition to having a higher burst pressure, the membrane according to the first aspect also has a suitably high pure water permeability rate, low salt permeability rate and high salt rejection rate. The calculations of the water permeability rate, salt permeability rate and salt rejection rate are described in detail with specific reference to a particular TFC hollow fibre membrane in the Example section. However, it would be understood by a person skilled in the art that the calculations may apply to other TFC hollow fibre membrane within the scope of the present invention, and not necessarily restricted to the specific support layer and selective layer described in the Example.

In particular, the TFC hollow fibre membrane may have a high pure water permeability rate of 3.5-4.0 $L\ m^{-2}\ h^{-1}\ bar^{-1}$. Even more in particular, the pure water permeability rate may be about 3.6-3.8 $L\ m^{-2}\ h^{-1}\ bar^{-1}$.

In particular, the TFC hollow fibre membrane may have a low salt permeability rate of 0.4-0.8 $L\ m^{-2}\ h^{-1}\ bar^{-1}$. Even more in particular, the pure water permeability rate may be about 0.45-0.75 $L\ m^{-2}\ h^{-1}\ bar^{-1}$.

In particular, the TFC hollow fibre membrane may have a favourably high salt rejection rate of 92-99.5%. Even more in particular, the salt rejection rate may be 95-97%.

The TFC hollow fibre membrane may be used for any suitable applications. In particular, the TFC hollow fibre membrane may be for use in, but not limited to, pressure retarded osmosis (PRO), low pressure reverse osmosis, nanofiltration. Even more in particular, the membrane may be used in PRO applications, particularly for osmotic power generation.

According to a second aspect, the present invention provides a method of forming the TFC hollow fibre membrane according to the first aspect, the method comprising:

preparing a module comprising at least one porous hollow fibre support layer potted in the module; and forming a selective layer on an inner circumferential surface of the hollow fibre support layer through interfacial polymerization, wherein the forming comprises contacting the surface of the porous hollow fibre support layer with a first solution comprising a polyamine, removing excess of the first solution by applying air and subsequently contacting the surface of the porous hollow fibre support layer with a second solution comprising a polyfunctional acyl halide.

The first solution may comprise any suitable polyamine. For example, the polyamine may be, but not limited to, m-phenylenediamine (MPD), p-phenylenediamine, p-xylenediamine, cyclohexanediamine, piperazine, branched or dendrimeric polyethylenimine, or a combination thereof. In particular, the polyamine may be MPD.

According to a particular aspect, the first solution may further comprise a surfactant. The surfactant may be any suitable surfactant. For example, the surfactant may be, but not limited to, sodium dodecyl sulphate (SDS), trimethylamine (TEA), camphorsulfonic acid (CSA), or a combination thereof. In particular, the surfactant may be SDS.

According to a particular embodiment, the first solution comprises MPD and SDS. For example, the first solution may comprise 1-4 wt % MPD and 0-2 wt % SDS. In particular, the first solution comprises a 2 wt % MPD aqueous solution and 0.1 wt % SDS solution.

The contacting with the first solution comprises introducing the first solution to an inner circumferential surface of the porous hollow fibre support layer for a pre-determined period of time. The removing excess of the first solution may then be carried out by applying air, such as purging air.

The second solution may comprise any suitable polyfunctional acyl halide. For example, the polyfunctional acyl halide may be, but not limited to, trimesoyl chloride (TMC), isophthaloyl chloride, terephthaloyl chloride, 1,3,5-cyclohexane tricarbonyl chloride, 1,2,3,4-cyclohexane tetracarbonyl chloride, or a combination thereof. In particular, the polyfunctional acyl halide may be TMC.

According to a particular aspect, the second solution may further comprise an organic solvent. The organic solvent may be any suitable organic solvent. For example, the organic solvent may be, but not limited to, hexane, heptane, cyclohexane, isoparaffinic hydrocarbon, or a combination thereof. In particular, the organic solvent may be hexane.

According to a particular embodiment, the second solution may comprise TMC and hexane. In particular, the second solution may comprise 0.05-0.3 wt % TMC in hexane. Even more in particular, the second solution may comprise 0.15 wt % TMC in hexane.

The contacting with the second solution may comprise introducing the second solution to the inner surface of the porous hollow fibre support layer saturated with the first solution for a pre-determined period of time to form the selective layer on the porous hollow fibre support layer.

The method may further comprise draining off the second solution, stabilising the selective layer formed and/or rinsing the thin film composite hollow fibre membrane. The draining off of the second solution may be by any suitable means. For example, the draining off of the second solution may be by purging air.

The method of the present invention may comprise first preparing the at least one porous hollow fibre support layer. According to a particular aspect, the porous hollow fibre support layer may be prepared by:

providing a dope solution comprising a polymer solution, a solvent/non-solvent mixture, an inorganic salt and water to an annulus of a spinneret, the polymer solution comprising: polyethersulfone (PES), polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof;

providing a bore solution to an inner tube of the spinneret; and extruding the dope solution and bore solution through the spinneret into a coagulation bath, thereby obtaining a porous hollow fibre support layer.

The inorganic salt may be any suitable inorganic salt. According to a particular aspect, the inorganic salt may be any suitable chloride, bromide, or a combination thereof. For example, the inorganic salt may be, but not limited to, LiBr, $CaCl_2$, LiCl, $MgCl_2$, or a combination thereof. In particular, the inorganic salt may be $CaCl_2$.

The dope solution may comprise a suitable amount of the inorganic salt. For example, the dope solution may comprise 0.5-5 wt % of inorganic salt. In particular, the dope solution may comprise 1-4.5 wt %, 1.5-4.0 wt %, 2.0-3.5 wt %, 2.5-3.0 wt %. Even more in particular, the dope solution may comprise 2-3 wt % of inorganic salt.

While the use of inorganic salts has been employed in membrane synthesis to alter the structure, hydrophilicity and performance of ultrafiltration and nanofiltration membranes, inorganic salts have not been utilised in the preparation of PRO membranes. The addition of inorganic salts in the preparation of the TFC hollow fibre membrane enhances the mechanical and transport properties of the membrane. It also enhances the physiochemical properties of the support layer and results in a thinner and more defect-free polyamide selective layer.

According to a particular aspect, the porous hollow fibre support layer may be formed of PES.

In particular, the dope solution may comprise the polymer in N-methyl-2-pyrrolidone (NMP), polyethylene glycol (PEG), an inorganic salt and water. NMP may act as a solvent for the polymer. PEG may be employed as a weak non-solvent additive to improve pore connectivity and to enhance pore formation. Water may be added in relatively small amounts to increase dope viscosity and lead the polymer solution close to a bimodal decomposition, resulting in sponge-like porous structure.

The inorganic salts in the dope solution may interact with the polymer matrix in the dope solution. The interaction of the inorganic salt with the polymer matrix may reinforce the polymer chains, thereby resulting in an increase in the tensile strength and burst pressure of the support layer. Upon addition of the inorganic salt in the dope solution, the shear viscosity of the dope solution increases. Accordingly, the water transport during the phase inversion process may be retarded.

Even more in particular, the dope solution comprises PES, NMP, PEG 400, water and $CaCl_2$. For example, the dope solution may comprise PES, NMP, PEG 400, water and $CaCl_2$ in the following composition: 20-25/30-40/30-40/1-5/1-2 wt % based on the total weight of the dope solution. In particular, the dope solution comprises PES, NMP, PEG 400, water and $CaCl_2$ in the following composition: 22/37.5/37.5/2/1 wt % based on the total weight of the dope solution.

The bore solution may be any suitable bore solution for the purposes of the present invention. For example, the bore solution may be, but not limited to, tap water, deionised (DI) water, NMP, or a combination thereof. In particular, the bore solution is DI water.

The coagulation bath may comprise any suitable coagulant. For example, the coagulation bath may comprise water, NMP or a combination thereof. In particular, the coagulation bath comprises water.

The porous hollow fibre support layer formed from the method may comprise a highly porous macrovoid structure sandwiched in the middle of the fibre walls with double dense skins. The dense skins may be formed as a result of water used as a both the bore fluid and the external coagulant. The porous substructure may be formed as a result of the fast phase separation process. The porous substructure minimises water transport resistance and is therefore advantageous in an osmosis driven process.

In particular, the support layer may have a typical dual layer finger-like macrovoid structure. The inner macrovoid layer may be thicker or longer than the outer macrovoid layer. Together, the two layers of uniform macrovoids may provide strong mechanical support against any applied pressure and render open channels for water transport.

The method described above enables robust hollow fibre support layers of various dimensions and morphologies to be formed with dense and smooth inner surfaces. In particular, the TFC hollow fibre membrane formed from a dope solution comprising about 1 wt % inorganic salt such as $CaCl_2$ yields a thin selective layer and therefore the highest pure water permeability (PWP) rate. The membrane may also have a high salt rejection because of its support layer having the smallest pores with a relatively narrow pore size distribution, which not only provides good mechanical support but also results in less defects on the selective layer when the TFC hollow fibre membrane is stabilised. Further, as a result of the high PWP and low salt reverse salt flux, salt leakage and internal salt concentration is minimised and a high effective driving force across the membrane is maintained. Therefore, the membrane has a high peak power density of up to about 38 $W/m^2$ at 30 bar.

The present invention also provides a method of generating osmotic power, the method comprising performing pressure retarded osmosis (PRO) using the TFC hollow fibre membrane according to the first aspect or a TFC hollow fibre membrane formed by the method of the second aspect of the present invention.

Advanced membranes with high operating pressures and energy output are needed when a hypersaline draw solution is used in PRO. In the present invention, a robust TFC hollow fibre membrane with high power densities to meet these requirements is formed and provided. In particular, the formation includes the addition of an inorganic salt in the polymer dope solution. The inorganic salt, such as $CaCl_2$ can significantly enhance the tensile strengths and burst pressures of the membranes. The hydrophilic additive can also alter the phase inversion process and hence change the morphologies and pore distributions of the support layer of the membrane. Importantly, the inorganic salt may be completely washed out during the phase inversion process and post-treatment in water.

Having now generally described the invention, the same will be more readily understood through reference to the following embodiment which is provided by way of illustration, and is not intended to be limiting.

Example

Chemicals and Materials

Polyethersulfone (PES, Solvay Advanced Polymer), N-methyl-2-pyrrolidone (NMP, >99.5%, Merck), polyethylene glycol 400 (PEG 400, Mw=400 g/mol, Sigma-Aldrich), calcium chloride ($CaCl_2$, Merck), lithium chloride (LiCl, Merck), magnesium chloride ($MgCl_2$, Merck) and deionized (DI) water were used to prepare the polymer dopes for the fabrication of hollow fibre substrates. A 50/50 wt % glycerol (industrial grade, Aik Moh Paints & Chemicals) aqueous solution was utilized for the post-treatment of as-spun hollow fibre substrates. PEGs with different molecular weights (Mw=6,000 g/mol, 12,000 g/mol and 35,000 g/mol, Sigma-Aldrich) were employed to determine the pore size distribution of the hollow fibre substrates. Isopropanol (IPA, >99.0%, J. T. Baker) was acquired to pre-wet the membrane substrates before interfacial polymerization. Trimesoyl chloride (TMC, >98%, Tokyo Chemical Industry), m-phenylenediamine (MPD, >99%, Tokyo Chemical Industry), sodium dodecyl sulphate (SDS, >97%, Fluka) and hexane (>99.9%, Fisher Chemicals) were used for interfacial polymerization. Sodium chloride (NaCl, 99.5%, Merck) was employed for the membrane characterizations and PRO performance tests.

Characterizations of Polymer Dopes

The coagulation value of a polymer dope is defined as the maximum weight percentage of water added to the polymer dope before it reaches the cloud point. The coagulation value was measured by adding water drop by drop until irreversible precipitation was induced. The shear viscosity of polymer solutions was measured by using a rotational cone-and-plate rheometer (AG-G2, TA Instruments, USA) with a diameter of 40 mm and 1° cone geometry at a shear rate of 100 sH.

The evolution of the phase inversion process was studied by introducing DI water gently to a drop of polymer dope under a polarized light microscope (PLM, Olympus BX50). The images were taken by the Image Pro Plus 6.0 software.

Fabrication of TFC-PES Hollow Fibre Membranes

Each inorganic salt ($CaCl_2$, LiCl or $MgCl_2$) was first dissolved in a mixture of NMP and PEG400 solution. Subsequently, the dried PES polymer was added into the premixed solution at 60° C. After the complete dissolution, the polymer dope was cooled down to the ambient temperature and then a pre-determined amount of DI water was added into it drop-by-drop. Each polymer dope was continuously stirred until a homogeneous solution was obtained, degassed and loaded into a syringe pump. The PES hollow fibre substrates were fabricated in a dry-jet web-spinning process through a single layer spinneret. Table 1 summarizes the dope compositions and the detailed spinning parameters.

TABLE 1

Spinning parameters of PES hollow fibre substrates

| Dope solution composition (wt %), i.e. | | | |
|---|---|---|---|
| PES:NMP:PEG400: | 20-25:30-40: | 20-25:30-40: | 20-25:30-40: |
| $H_2O$:salt | 30-40:1-5:0 | 30-40:1-5:1 | 30-40:1-5:2 |
| Bore fluid | $H_2O$ | | |
| Dope flowrate/bore fluid flowrate | 2, 2.5, 3 respectively | | |
| Air gap (mm) | 5-50 | | |
| Take-up speed (m/min) | 1-5 | | |
| External coagulant | $H_2O$ | | |
| Coagulation value (%) | 4.99 ± 0.24 | 4.31 ± 0.24 | 3.38 ± 0.24 |

The weight ratio of NMP to PEG 400 was maintained at 1:1. The total weight percentages of NMP and PEG 400 were adjusted to accommodate the increasing weight percentage of $CaCl_2$, while the weight percentages of PES and DI water remained constant. The volumetric flowrate of the bore fluid was kept constant, while the volumetric flowrate of the polymer dope was varied with a volumetric ratio range of 2-3 to the bore fluid. The as-spun PES hollow fibre substrates were soaked in tap water for two days to remove the residual solvents and additives, post-treated in a 50/50 wt % glycerol aqueous solution for another two days and air dried at ambient temperature.

Lab-scale modules consisting of three 15 cm long PES hollow fibre substrates in a parallel configuration were assembled. Each module was pre-wetted by circulating IPA on the lumen side of the hollow fibre substrates for 30 second and subsequently soaked in DI water for 60 min before interfacial polymerization. First, a 2 wt % MPD aqueous solution containing 0.1 wt % SDS was circulated on the lumen side of the hollow fibres for 3 min. Subsequently, the excessive MPD solution was removed by purging air for 5 min. Second, a hexane solution with 0.15 wt % TMC was brought into contact with MPD absorbed on the inner surfaces of the hollow fibre substrates for 5 min to form a thin polyamide selective layer. The resultant TFC-PES membranes were purged with air for 1 min to remove the residual hexane. The TFC-PES hollow fibre membranes were then stored in DI water, ready for characterizations and PRO evaluations.

Characterizations of the PES Hollow Fibre Substrates

Membrane morphologies were obtained by the field emission scanning electronic microscopy (FESEM, JEOL JSM-6700). A scanning electron microscope (JSM-5600LV, JEOL) with energy dispersive x-ray spectroscopy (INCA x-act, Oxford Instruments) (SEM-EDX) was used to examine the elements of the PES substrates The pure water permeability (PWP) (L/($m^2$ hr bar), LMH/bar) of the PES hollow fibre membrane substrates were measured by pumping DI water into the lumens of the hollow fibre membranes at 1 bar and collecting the permeate from the shell side. The PWP was calculated as:

$$A = \frac{\Delta V}{M \Delta t \Delta P} \quad (1)$$

where $\Delta V$ (L) is the volumetric change of permeate collected over a period of $\Delta t$ (h) during the test, M ($m^2$) is the effective permeation area, and $\Delta P$ (bar) is the transmembrane pressure difference.

The molecular weight cut-off (MWCO), mean pore diameter and pore size distribution of the PES hollow fibre substrates were measured by circulating 200 ppm PEGs with different molecular weights at 1 bar along the lumen side of the hollow fibre substrates and then analysed. The solute diameters ($d_s$, m) of PEGs with different molecular weights (Mw) can be calculated from the following equations.

$$d_s = 33.46 \times 10^{-12} \times M_w^{0.557} \tag{2}$$

Then MWCO was determined at 90% rejection (R). The mean effective pore size ($\mu_p$) was defined as the solute geometric mean size ($\mu_s$) at 50% rejection, and the geometric standard deviation ($\sigma_p$) is defined as the ratio between $d_s$ at R=84.13% to $d_s$ at R=50%. Then the pore size distribution can be expressed as following.

$$\frac{dR(d_p)}{dd_p} = \frac{1}{d_p \ln \sigma_p \sqrt{2\pi}} \exp\left[-\frac{(\ln d_p - \ln \mu_p)^2}{2(\ln \sigma_p)^2}\right] \tag{3}$$

To measure the porosity, the PES hollow fibre substrates were cut into segments and dried in a freeze dryer overnight before weighted. The overall porosity ($\varepsilon$, %) can be calculated from the mass of the hollow fibre segments (m) and the mass of a solid PES cylinder.

$$\varepsilon = \left(1 - \frac{m}{\frac{3}{4}\pi l \rho_P (OD - ID)^2}\right) \times 100\% \tag{4}$$

where $\rho_p$ is the PES polymer density of 1.37 g/cm$^3$, l, OD, ID are the length, outer and inner diameters of the hollow fibre membranes, respectively.

Since the dynamic water contact angles of the inner skins of hollow fibre substrates cannot be directly measured, the same spinning dopes were cast into flat sheet membranes, post-treated in DI water for 2 days and freeze-dried. The dynamic water contact angles of the flat sheet membranes were then measured using a Rame-Hart contact angle goniometer (model 100-22) by the sessile drop method.

The tensile strengths of the PES hollow fibre substrates were measured by an Instron tensiometer (Model 5542, Instron) under a constant elongation rate of 20 mm/min with an initial sample length of 50 mm.

Characterisation of the TFC-PES Hollow Fibre Membrane

The PWP (A) and salt permeability (B) of the TFC-PES hollow fibre membranes were measured using a reverse osmosis (RO) setup. Before the tests, the TFC-PES membranes were stabilized by pressurizing it from inside out at their respective maximum operating pressures using DI water for 60 minutes. Then the permeate from the shell side was collect and the pure water permeability was calculated from equation (1).

The membrane rejections (R) to NaCl was obtained by using a 2000 ppm NaCl solution as the feed. The conductivities of the permeate and feed were measured to calculate R using the following equation:

$$R = \left(1 - \frac{c_p}{c_f}\right) \times 100\% \tag{5}$$

where $C_f$ and $C_p$ refer to the concentrations of the feed and permeate, respectively. Salt permeability B (L/(m$^2$ hr), LMH) was then calculated using the following equation:

$$B = \frac{1-R}{R}(\Delta P - \Delta \pi)A \tag{6}$$

where $\Delta n\pi$ is the osmotic pressure difference across the membrane.

Osmotic Power Generation Via the PRO Process

A 1.2 M NaCl solution was employed as the draw solution to mimic the seawater brine from a 50% recovery desalination plant. The PRO tests were conducted with the draw solution facing the inner selective skin (i.e., lumen side) and DI water facing the outer substrates (i.e., shell side) of the TFC-PES hollow fibre membranes. The experimental conditions are summarised in Table 2.

TABLE 2

Summary of PRO experimental conditions

| | Lumen side draw solution | Shell side feed solution |
|---|---|---|
| Flowrate (ml/min) | 200 | 200 |
| Pressure (bar) | 0-30 | 0 |
| Temperature (° C.) | 25 | 25 |

The membranes were pre-pressurized at their respective maximum operating pressures for 60 minutes before the tests. While the DI water was maintained at the atmospheric pressure, the pressure of the 1.2 M NaCl solution was increased from the atmospheric pressure to the respective maximum operating pressures of the membranes. The mass and conductivity of the feed solution were recorded every second for 30 minutes using a digital data logging system. The water permeation flux $J_w$ (LMH) was calculated from the volumetric change of the feed solution.

$$J_w = \frac{\Delta V_f}{M \Delta t} \tag{7}$$

The reverse salt flux from the draw solution to the feed solution, $J_s$ (g/(m$^2$ hr), gMH), was calculated from the change of salt concentration in the feed solution.

$$J_s = \frac{\Delta(V_f C_f)}{M \Delta t} \tag{8}$$

where $C_f$ and $V_f$ are the salt concentration and volume of the feed solution, respectively. The theoretical osmotic power density, W, was calculated from $$W = \frac{J_w \Delta P}{36} \tag{9}$$

The factor of 36 is to convert the unit of W to w/m$^2$.

The structure parameter (S) of the membrane is defined as $$S = \frac{\tau \lambda}{\varepsilon} \tag{10}$$

where $\tau$, $\varepsilon$ and $\lambda$ are the tortuosity, porosity and wall thickness of the hollow fibre membranes, respectively. However, the tortuosity of the membrane cannot be accurately measured. Therefore, the structural parameter (S) is calculated from the $J_w$ and A, B values by solving the following equations.

$$J_w = A\left(\frac{\pi_d - \pi_f \exp\left(\frac{J_w S}{D}\right)}{1 + \frac{B}{J_w}\left[\exp\left(\frac{J_w S}{D}\right) - 1\right]} - \Delta P\right) \quad (11)$$

where $\pi_d$ is the osmotic pressure of the draw solution and $\pi_f$ is the osmotic pressure of the feed solution, respectively.

Results and Discussions

Screening of Inorganic Salt Additives

The PRO performances of the TFC membranes spun from dopes comprising 1 wt % salts and a fixed dope to bore fluid ratio of 2.5 are shown in FIG. 1. At 28 bar, the TFC membranes with $CaCl_2$, LiCl and $MgCl_2$ additives can generate a power density of 34.7 W/m², 32.4 W/m² and 27.4 W/m², respectively. In contrast, the TFC membranes without any salt additives can only sustain a pressure of 25 bar and achieve a peak power density of 25.1 W/m². As compared to other salts, $CaCl_2$ yields the highest water flux and lowest reverse flux. Moreover, $CaCl_2$ is most soluble in water and can be effectively leached out from the substrates during post-treatments. Therefore, $CaCl_2$ is chosen as the most favourable additive and its effects on the TFC membranes are investigated in the following studies.

Mechanical Strengths of the PES Hollow Fibre Substrates

To achieve the target operating pressure of 30 bar, the mechanical properties of the PES hollow fibre substrates spun from dopes with different salt concentrations and dope to bore fluid ratios were investigated and shown in Table 3.

TABLE 3

Burst pressures and tensile strengths of PES substrates with different $CaCl_2$ dosages and different flowrates

| $CaCl_2$ concentration | 0 wt % | | | 1 wt % | | | 2 wt % | | |
|---|---|---|---|---|---|---|---|---|---|
| Dope/bore ratio | 2 | 2.5 | 3 | 2 | 2.5 | 3 | 2 | 2.5 | 3 |
| Tensile strength (MPa) | 4.40 | 4.52 | 4.64 | 4.67 | 5.12 | 5.85 | 4.99 | 5.50 | 6.44 |
| Burst pressure (bar) | 22 | 25 | 28 | 24 | 28 | 33 | 25 | 28 | >35 |

According to the Barlow's equation, the burst pressure of a tubular structure with fixed dimensions is approximately proportional to its tensile strength.

$$P \approx \frac{2x\tau}{OD} \quad (12)$$

where x is the wall thickness, $\tau$ is the tensile stress and P is the burst pressure. Therefore, the burst pressure increases with the tensile strength with an increase in the dope to bore fluid ratio. At a flowrate ratio of 3, the substrates with 0 wt %, 1 wt % and 2 wt % of $CaCl_2$ respectively exhibit a tensile strength of 4.64 MPa, 5.84 MPa and 6.44 MPa and a burst pressure of 28 bar, 33 bar and >35 bar. The increase in both tensile strength and burst pressure of the PES substrates indicates that $CaCl_2$ can interact with the PES matrix and reinforce the polymer chains. The resultant PES substrates sustains stronger longitudinal and radial stresses. Since the target PRO operating pressure is 30 bar, a dope flowrate to bore fluid flowrate ratio of 3 was used to prepare the membranes.

Effects of $CaCl_2$ on the Phase Inversion Process

Since $CaCl_2$ is highly soluble in water and highly hydrophilic, the addition of $CaCl_2$ changes the physicochemical properties (i.e., hydrophilicity, rheology and dope stability) of polymer dopes and alters the kinetics and path of the phase inversion process. As a result, it affected the morphology and pore structure of the PES substrates.

Figure 2:
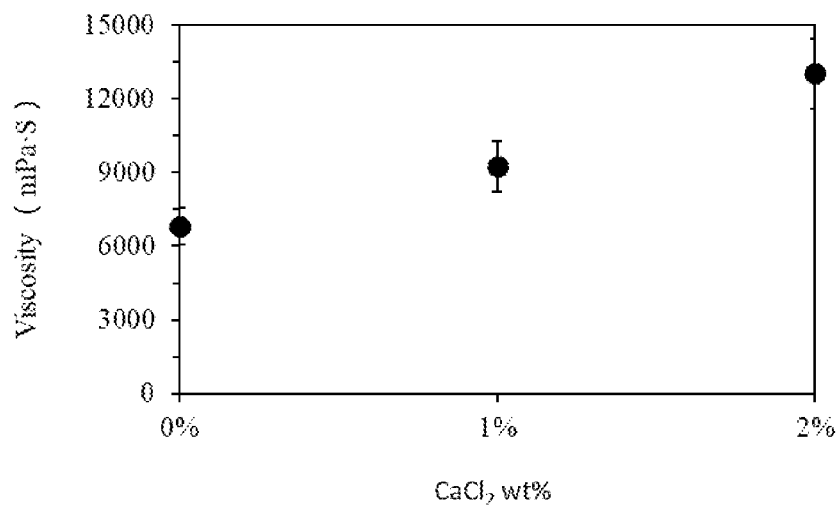
FIG. 2 shows the shear viscosities of the polymer dope solution with different inorganic salt concentrations at 100/s.

FIG. 2 shows that the shear viscosity of the polymer dopes increased from 6821 mPaS to 9255 mPaS when 1 wt % of $CaCl_2$ was added, and further increased to 13024 mPaS when 2 wt % of $CaCl_2$ was added. The increased viscosity retarded the water transport during the phase inversion process. On the other hand, $CaCl_2$ competed with the polymer to dissolve in the solvent during the phase inversion process and made the polymer dope less stable. The coagulation value of the polymer dope is defined as the maximum weight percentage of water added to the polymer dope before it reaches the cloud point. As shown in Table 1, as more $CaCl_2$ was added to the dope, the coagulation value decreased monotonically from 4.99% to 3.38%, indicating that the dope composition shifted closer to the binodal curve. Moreover, the hydrophilic additives attracted water into the dope solution during the phase inversion process, which led to a faster phase inversion.

Figure 3:
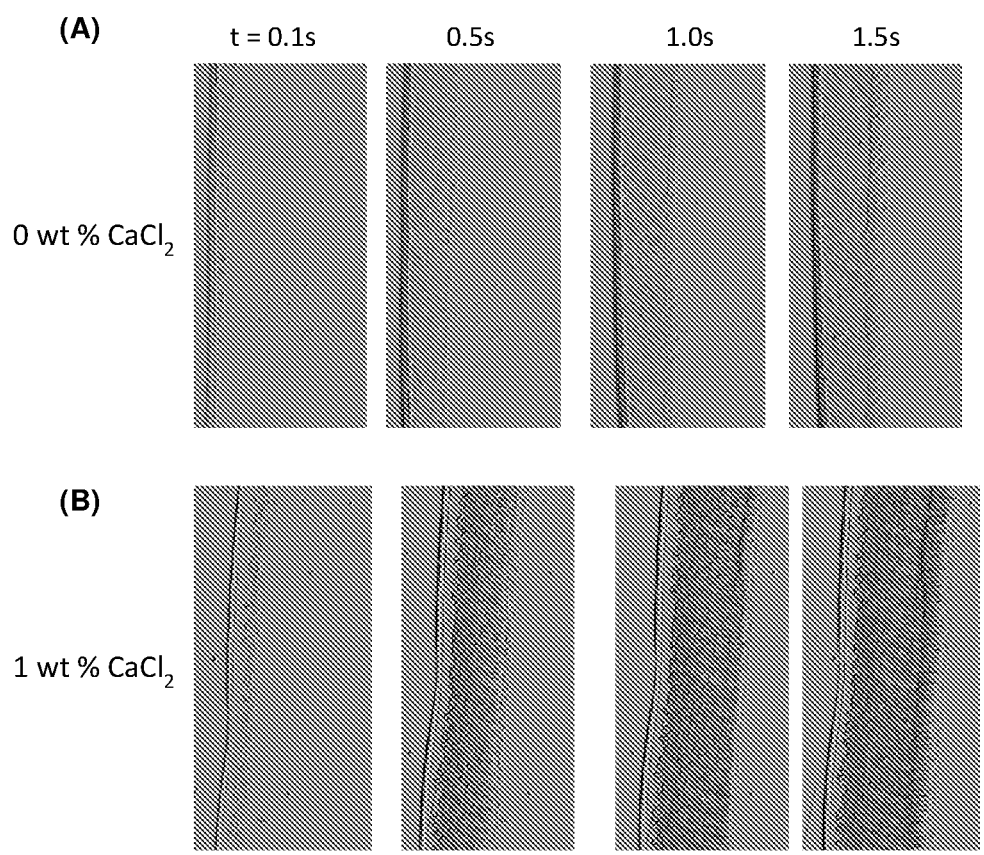
FIG. 3 shows the evolution of the phase inversion process with time under a PLM (×10 magnification) as a function of $CaCl_2$ salt content in a polymer dope when introducing water.
Figure 3:
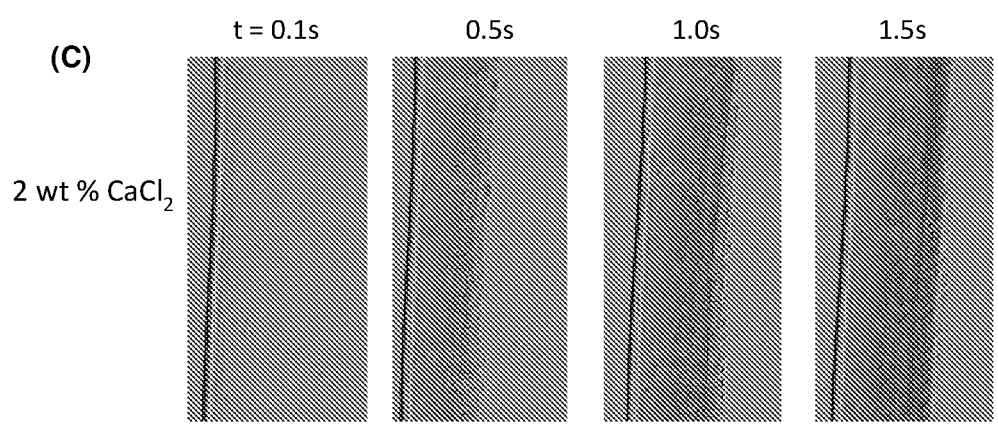

FIG. 3 shows the evolution of the phase inversion process with time under a polarized microscope (PLM) at a magnification of 10 as a function of $CaCl_2$ concentration in polymer dopes when water was introduced from the left-hand side. The competing effects from (1) enhanced hydrophilicity (i.e., accelerated water transport), (2) higher viscosity (i.e., retarded water transport) and (3) greater dope instability due to the presence of $CaCl_2$ on phase inversion was captured at intervals of 0.5 s. Thin skin layers were immediately formed upon the contact of water and the polymer dopes. When no $CaCl_2$ was added, the polymer dope had a low viscosity, which caused rapid non-solvent intrusion. As a result, a layer of finger-like macrovoids were formed beneath the thin skin from 0.5 s to 1.5 s. The polymer dope with a higher concentration of $CaCl_2$ was closer to the binodal curve and had a more rapid phase inversion rate, leading to a thicker skin layer and a thicker solidification region during 0 s to 0.5 s. With the addition of 1 wt % $CaCl_2$ in the polymer dope, the moving front moved faster and further because of the increased hydrophilicity of the polymer dope, while the sponge-like layer beneath the skin became thicker before the formation of the macrovoids due to the higher viscosity and the higher resistance to the non-solvent intrusion. The thicker solidification region and the highly viscous environment further compressed the formation of the finger-like macrovoids from 0.1 s to 1.5 s when 2 wt % $CaCl_2$ was added into the dope.

Effects of $CaCl_2$ on the Morphology of the PES Substrates

Figure 4:
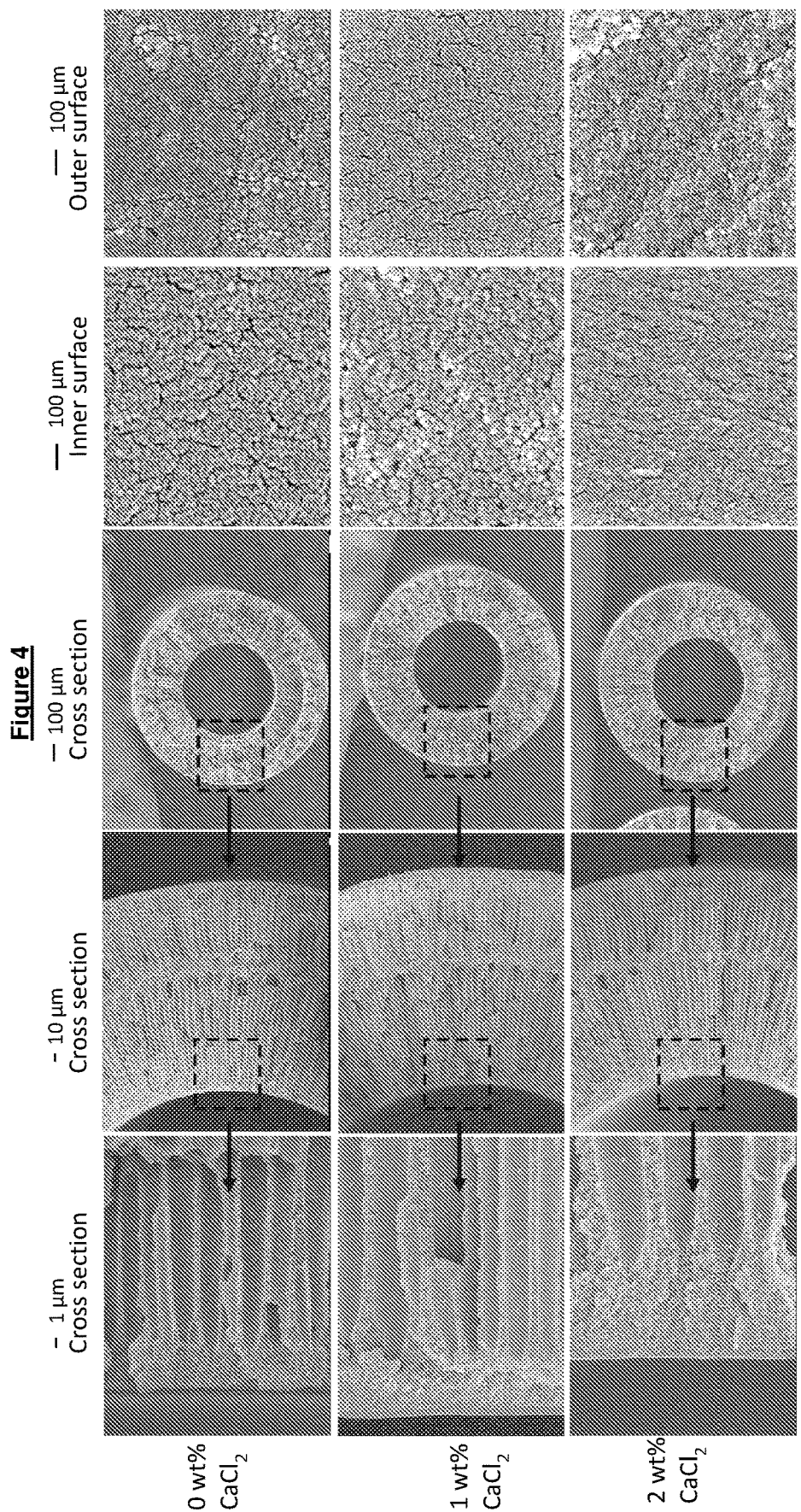
FIG. 4 shows the FESEM morphologies of the PES hollow fibre support layers formed from polymer dope comprising 0 wt %, 1 wt % and 2 wt % $CaCl_2$, respectively.

The morphologies of the PES hollow fibre substrates spun from different dopes are shown in FIG. 4. Because water was used as both the bore fluid and external coagulant, dense skins were formed on both the inner and outer surfaces. A sponge-like structure was formed beneath the inner skin. The thickness of the sponge-like layers followed the order of the thickness of the solidification regions observed in FIG. 3. It became thicker as more $CaCl_2$ was added and the dope composition shifted closer to the binodal decomposition. A highly porous macrovoid structure was sandwiched in the middle of the fibre walls. As the thickness of the sponge layer increased and the thickness of the macrovoid decreased, the porosity of the PES substrate in Table 4 decreased at higher dosages of $CaCl_2$ in the dope.

TABLE 4

Characteristics of PES hollow fibre substrates

| CaCl$_2$ concentration | 0 wt % | 1 wt % | 2 wt % |
|---|---|---|---|
| Pure water permeability (LMH/bar) | 132.0 | 107.5 | 126.7 |
| Mean pore diameter (nm) | 7.27 | 6.05 | 6.85 |
| Geometric standard deviation | 1.34 | 1.37 | 1.42 |
| MWCO (kDa) | 40,177 | 17,757 | 42,400 |
| Water contact angle (°) | 49.2 ± 1.9 | 48.6 ± 1.2 | 49.4 ± 1.9 |
| Inner diameter (μm) | 529.1 ± 3.8 | 527.4 ± 5.4 | 524.1 ± 6.2 |
| Outer diameter (μm) | 1081.3 ± 12.6 | 1072.6 ± 9.7 | 1064.2 ± 11.4 |
| Porosity (%) | 74.1 ± 0.8 | 73.3 ± 0.5 | 71.7 ± 0.6 |

The PES hollow fibre substrates with different CaCl$_2$ concentrations had the typical dual layer finger-like macrovoid structure. This was caused by water intrusions from both the inner and outer surfaces. The inner dope immediately contacted with the bore fluid water when being extruded from the spinneret, while the outer dope needed to travel through the air gap before contacting the external coagulant water. Moreover, the humidity in the air gap induced a gel-like skin on the outer surface that slowed down the water intrusion from the outer surface in the coagulation bath. Therefore, the non-solvent had a longer time and a smaller resistance to intrude from the inner surface. As a result, the inner macrovoid layer tended to be thicker or longer than the outer macrovoid layer. The two layers of uniform macrovoids provide strong mechanical support against the applied pressure and render open channels for water transport.

Effects of CaCl$_2$ on the PES Substrates' PWPs and Pore Sizes

Figure 5:
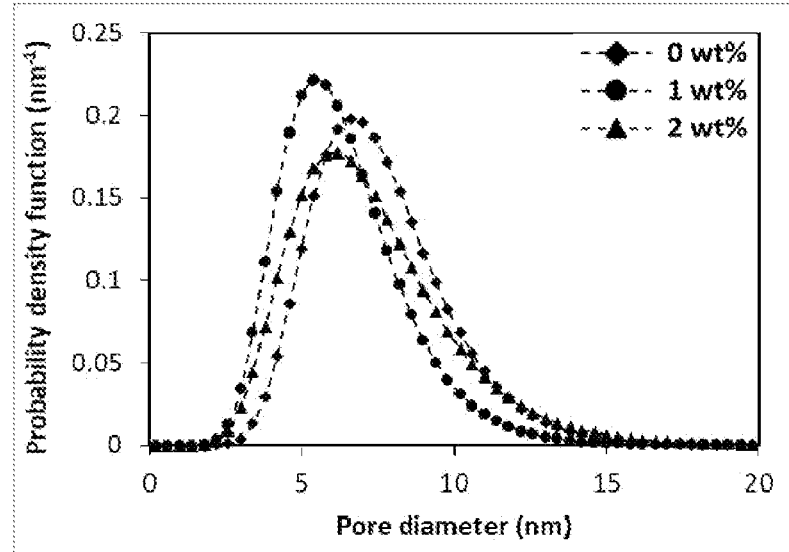
FIG. 5 shows the pore size probability function curves of different PES hollow fibre support layers.

The addition of CaCl$_2$ affected not only the morphology but also the pore size distribution of the substrates. In the absence of CaCl$_2$, the resultant hollow fibre had the largest mean pore diameter but the smallest standard deviation, as shown in Table 4 and FIG. 5. The phase inversion rate was altered, resulting in the smallest mean pore size of 6.05 nm when 1 wt % CaCl$_2$ was added into the dope due to the combinative effects of higher hydrophilicity and higher viscosity. Since the addition of 2 wt % CaCl$_2$ brought the dope closer to the binodal curve and induced local instabilities, instantaneous decomposition occurred in a less orderly manner when the dope contacted with water, which resulted in random pores. Therefore, the membrane made from dope containing 2 wt % CaCl$_2$ had a relatively larger mean pore diameter and the broadest distribution. The PES substrates spun from dopes comprising 0, 1 and 2 wt % CaCl$_2$ had PWPs of 132.0, 107.5 and 126.7 LMH/bar, respectively, which followed the order of their mean pore diameters.

Morphology of TFC-PES Hollow Fibre Membranes

Figure 6A:
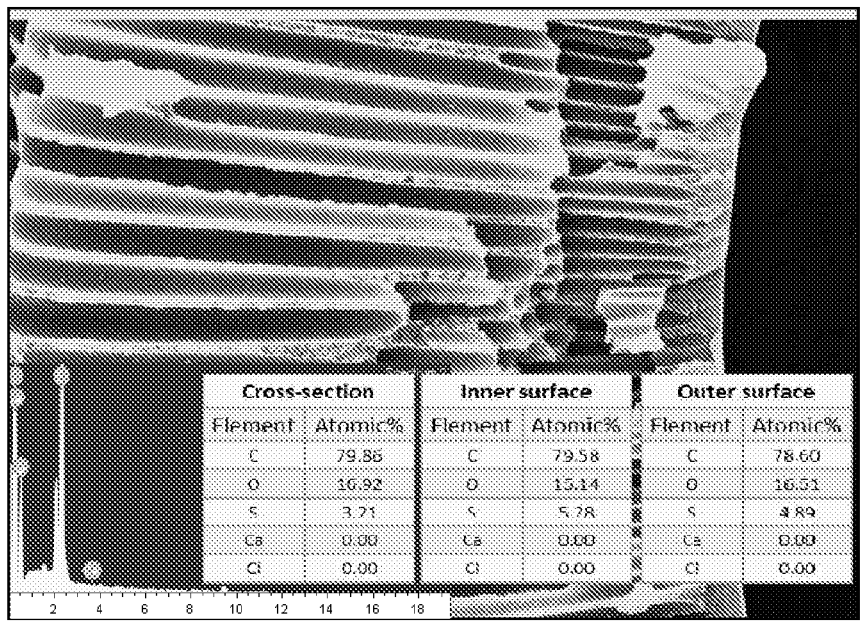
FIGS. 6A and 6B show the SEM-EDX analyses of $CaCl_2$ inside PES substrate spun from dopes containing 1 wt % $CaCl_2$ and 2 wt % $CaCl_2$, respectively.
Figure 6B:
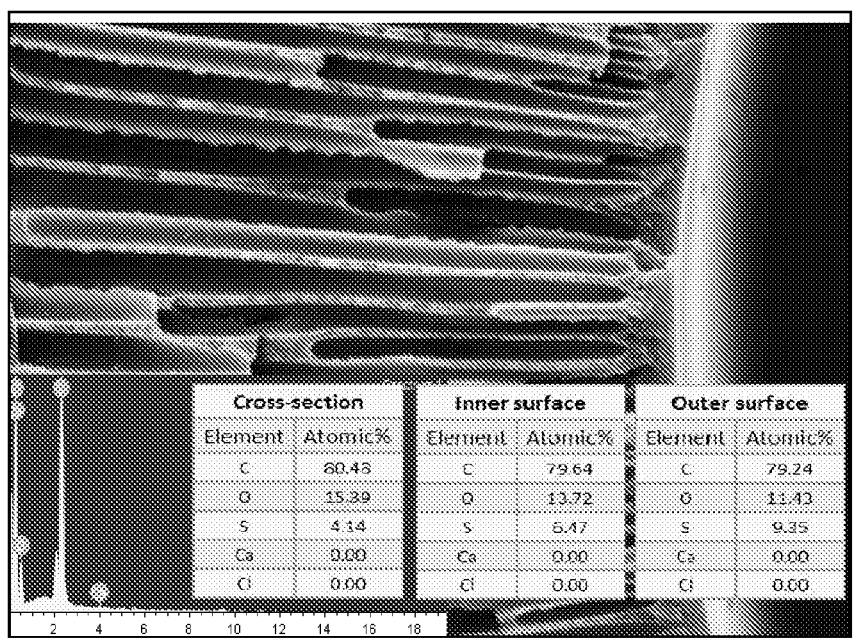

If CaCl$_2$ is retained in the PES substrates, it may change the surface chemistry of the substrates and consequently the formation of the selective layer. Therefore, SEM-EDX was used to analyse the elements on the inner surface, outer surface and cross section of the substrates. As shown in FIG. 6, no calcium or chlorine was detected in any of the substrates. This is because the molecular weight of CaCl$_2$ is much smaller than the MWCO values of the substrates and CaCl$_2$ does not react with PES. The SEM-EDX results confirmed that CaCl$_2$ was completely washed out from the PES substrates during the phase inversion and post-treatment in water. This was also confirmed by the water contact angle measurements in Table 4. Since CaCl$_2$ was completely washed out from the substrates, the water contact angles remained approximately 49° regardless of the CaCl$_2$ concentrations added into the polymer dopes.

Figure 7A:
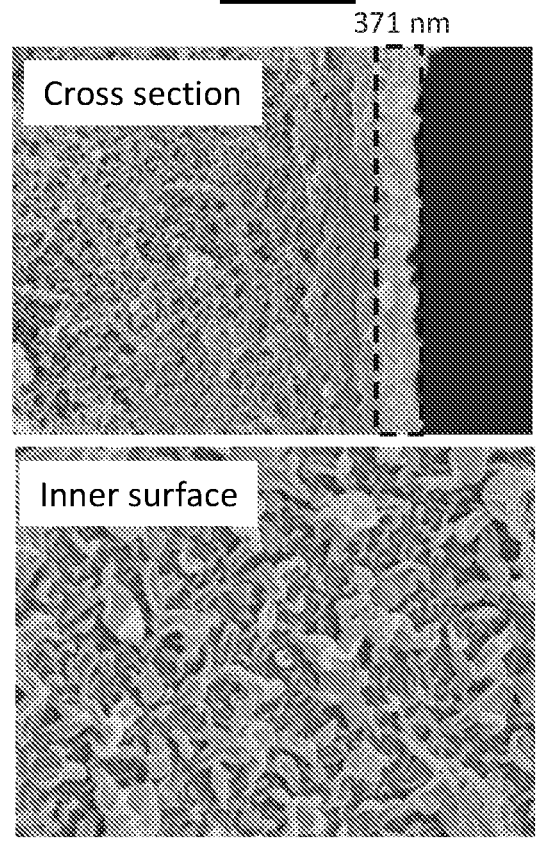

FIG. 7 shows the cross sections and the inner surfaces of the thin film polyamide selective layers synthesized by interfacial polymerization onto different PES substrates. The polyamide selective layers showed the typical nodular "leaf-like" and "ridge-and-valley" morphologies caused by the uncontrolled and rapid reaction between MPD and TMC. The thinnest selective layer of 257 nm was formed on the substrate spun from the dope with 1 wt % CaCl$_2$, followed by 329 nm on the substrate with 2 wt % CaCl$_2$ and 371 nm on the substrate without CaCl$_2$. This was consistent with the different pore sizes of the PES substrates. During the interfacial polymerization, the MPD aqueous solution was first absorbed into the pores of substrates' inner surfaces and then slowly released from the pores to react with the TMC solution and form the polyamide layer. A smaller pore tends to have a slower release rate. Therefore, the substrate with smaller pores formed a thinner polyamide layer.

Transport Properties and PRO Performance of the TFC-PES Hollow Fibre Membranes

The pure water permeabilities (A), NaCl rejections (R), salt permeabilities (B) and structural parameters (S) of different TFC-PES membranes are listed in Table 5.

TABLE 5

Characteristics of TFC-PES hollow fibre membranes

| CaCl$_2$ | A (LMH/bar) | R (%) | B (LMH) | S (μm) | Thickness of TFC layer (nm) |
|---|---|---|---|---|---|
| 0 wt % | 3.3 ± 0.13 | 95.9 ± 1.2 | 0.58 ± 0.02 | 422 ± 15 | 371 |
| 1 wt % | 3.8 ± 0.20 | 97.3 ± 1.4 | 0.44 ± 0.03 | 430 ± 11 | 257 |
| 2 wt % | 3.6 ± 0.16 | 95.3 ± 2.3 | 0.73 ± 0.03 | 457 ± 18 | 329 |

All membranes possess high A values above 3 LMH/bar and high rejections above 95%. Since all the TFC-PES membranes showed similar selective layer morphologies, their PWPs followed the reverse order of the thicknesses of the selective layers. The TFC-PES membrane spun from the dope with 1 wt % CaCl$_2$ yielded the thinnest selective layer and therefore the highest PWP. It also had the highest rejection of 97.3% because its substrate had the smallest pores with a relatively narrow pore size distribution, which not only provided good mechanical support but also resulted in less defects on the selective layer when the TFC membrane was stabilized at 30 bar.

Figure 8:
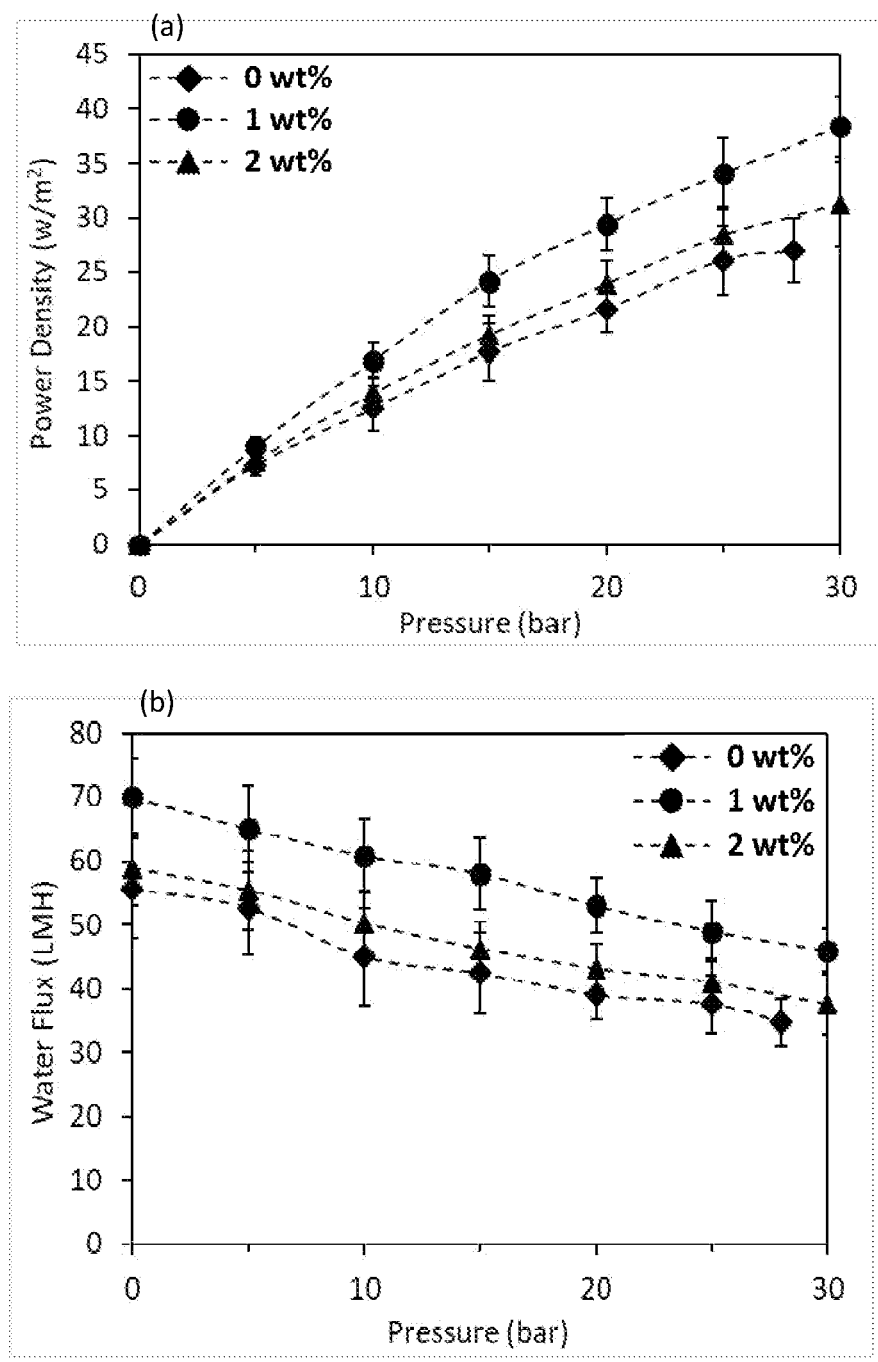
FIG. 8 shows the PRO tests using a 1.2 M NaCl solution as the draw solution and DI water as the feed solution.
Figure 8:
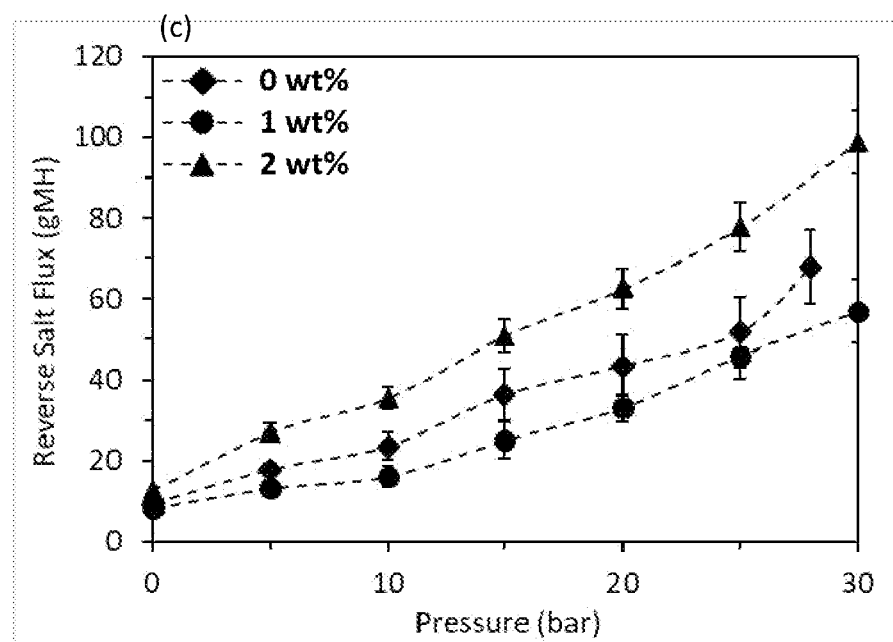

FIG. 8 (a) shows the power density of the TFC hollow fibre membranes spun from dope with different CaCl$_2$ concentrations, while FIGS. 8 (b) and (c) display their water fluxes and reverse salt fluxes in PRO tests using 1.2 M NaCl and DI water as the feed pair. Consistent with the trends of A and B values, the membrane spun from the dope comprising 1 wt % CaCl$_2$ produced the highest water flux of 70 LMH at 0 bar and 46 LMH at 30 bar and the lowest reverse salt flux, due to its highest A value and lowest B value. As a result, this membrane had the highest peak power density of 38 W/m$^2$ at 30 bar. The membrane spun from the dope with 2 wt % CaCl$_2$ achieved a peak power density of 31

W/m² at 30 bar, while the membrane without CaCl₂ only sustained a hydraulic pressure of 28 bar with a corresponding power density of 27 W/m². This was because the membrane spun from the dope with 2 wt % CaCl₂ had a higher pure water permeability than the membrane without CaCl₂. However, its high water permeability advantage was partially offset by its high salt permeability because it had more severe internal concentration polarization caused by the increased reverse salt flux. Therefore, its power density was only marginally better than the membrane without CaCl₂.

Whilst the foregoing description has described exemplary embodiments, it will be understood by those skilled in the technology concerned that many variations may be made without departing from the present invention.

The invention claimed is:

1. A thin film composite (TFC) hollow fibre membrane comprising:
  A porous hollow fibre support layer formed of polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination therefore, the hollow fibre support layer having a thickness of 100-500 μm, and wherein the hollow fibre support layer has a dual-layer finger-like macrovoid structure; and
  A selective layer on an inner circumferential surface of the hollow fibre support layer, the selective layer formed of a cross-linked polyamide and having a thickness of 100-500 nm,
Wherein the TFC hollow fibre membrane has a power density of 25-50 W/m² at a pressure of 30 bar using a 1.2 M NaCl draw solution and a deionized water feed solution and is prepared from a dope solution comprising a polymer solution, a solvent/non-solvent mixture, a calcium salt and water.

2. The TFC hollow fibre membrane according to claim 1, wherein the hollow fibre support layer is formed of polyethersulfone.

3. The TFC hollow fibre membrane according to claim 1, wherein the TFC hollow fibre membrane has a pure water permeability rate of 3.5-4.0 L m⁻²h⁻¹ bar⁻¹.

4. The TFC hollow fibre membrane according to claim 1, wherein the TFC hollow fibre membrane has a burst pressure of at least 28-35 bar.

5. The TFC hollow fibre membrane according to claim 1, wherein the TFC hollow fibre membrane has a salt rejection rate of 92-99.5%.

6. The TFC hollow fibre membrane according to claim 1, for use in pressure retarded osmosis (PRO).

7. The TFC hollow fibre membrane according to claim 1, wherein the hollow fibre membrane is prepared from a dope solution comprising a polymer solution, a solvent/non-solvent mixture, a calcium salt and water, the polymer solution comprising: polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof.

8. A method of forming the TFC hollow fibre membrane according to claim 1, the method comprising:
  preparing a module comprising at least one porous hollow fibre support layer potted in the module, the porous hollow fibre support layer prepared by:
  providing a dope solution comprising a polymer solution, a solvent/non-solvent mixture, a calcium salt and water to annulus of a spinneret, the polymer solution comprising: polyethersulfone, polysulfone, polyphenylsulfone, polyacrylonitrile, polyimide, polyether imide, polyamide-imide, polyvinylidene fluoride, cellulose acetate, cellulose triacetate, polyetherketone, polyetheretherketone or a combination thereof,
  providing a bore solution to an inner tube of the spinneret; and
  extruding the dope solution through the spinneret into a coagulation bath thereby obtaining a porous hollow fibre support layer; and
  forming a selective layer on an inner circumferential surface of the hollow fibre support layer through interfacial polymerization, wherein the forming comprises contacting the surface of the porous hollow fibre support layer with a first solution comprising a polyamine, removing excess of the first solution by applying air and subsequently contacting the surface of the porous hollow fibre support layer with a second solution comprising a polyfunctional acyl halide.

9. The method according to claim 8, wherein the calcium salt is a chloride, bromide, or a combination thereof.

10. The method according to claim 8, wherein the calcium salt is CaCl₂.

11. The method according to claim 8, wherein the first solution comprises a polyamine selected: m-phenylenediamine (MPD), p-phenylenediamine, p-xylylenediamine, cyclohexanediamine, piperazine, branched or dendrimeric polyethylenimine, or a combination thereof.

12. The method according to claim 8, wherein the first solution further comprises a surfactant.

13. The method according to claim 12, wherein the surfactant is: sodium dodecyl sulphate (SDS), trimethylamine (TEA), camphorsulfonic acid (CSA), or a combination thereof.

14. The method according to claim 8, wherein the second solution comprises a polyfunctional acyl halide selected from: trimesoyl chloride (TMC), isophthaloyl chloride, terephthaloyl chloride, 1,3,5-cyclohexane tricarbonyl chloride, 1,2,3,4-cyclohexane tetracarbonyl chloride, or a combination thereof.

15. The method according to claim 8, wherein the second solution further comprises an organic solvent.

16. The method according to claim 15, wherein the organic solvent is: hexane, heptane, cyclohexane, isoparaffinic hydrocarbon, or a combination thereof.

17. A method of generating osmotic power, the method comprising performing pressure retarded osmosis (PRO) using the TFC hollow fibre membrane according to claim 1.

* * * * *